United States Patent
Hasan et al.

(10) Patent No.: US 9,477,619 B2
(45) Date of Patent: Oct. 25, 2016

(54) PROGRAMMABLE LATENCY COUNT TO ACHIEVE HIGHER MEMORY BANDWIDTH

(71) Applicant: Cypress Semiconductor Corporation, San Jose, CA (US)

(72) Inventors: Qamrul Hasan, Santa Clara, CA (US); Dawn M. Hopper, San Jose, CA (US); Clifford Alan Zitlaw, Chico, CA (US)

(*) Notice: Subject to any disclaimer, the term of this patent is extended or adjusted under 35 U.S.C. 154(b) by 331 days.

(21) Appl. No.: 13/913,909

(22) Filed: Jun. 10, 2013

(65) Prior Publication Data

US 2014/0365744 A1  Dec. 11, 2014

(51) Int. Cl.
  *G06F 13/40* (2006.01)
  *G06F 13/16* (2006.01)
  *G06F 13/42* (2006.01)
  *G06F 3/06* (2006.01)

(52) U.S. Cl.
  CPC ......... *G06F 13/1689* (2013.01); *G06F 3/0613* (2013.01); *G06F 3/0655* (2013.01); *G06F 3/0683* (2013.01); *G06F 13/161* (2013.01); *G06F 13/4243* (2013.01); *G06F 13/4291* (2013.01)

(58) Field of Classification Search
  CPC .. G06F 3/0613; G06F 3/0655; G06F 3/0683; G06F 13/161; G06F 13/1689; G06F 13/4243; G06F 13/4291
  USPC ................. 711/154, 167, 168, 169
  See application file for complete search history.

(56) References Cited

U.S. PATENT DOCUMENTS

| | | | |
|---|---|---|---|
| 2002/0057615 A1 | 5/2002 | Yahata et al. | |
| 2006/0179262 A1* | 8/2006 | Brittain ............... | G06F 13/1631 711/169 |
| 2007/0005877 A1* | 1/2007 | Tetrick .................. | 711/105 |
| 2007/0005922 A1* | 1/2007 | Swaminathan ..... | G06F 13/1689 711/167 |
| 2008/0215783 A1* | 9/2008 | Allen et al. ............ | 710/118 |
| 2009/0235014 A1 | 9/2009 | Yim et al. | |
| 2010/0049936 A1 | 2/2010 | Lin | |
| 2011/0153900 A1* | 6/2011 | Zitlaw .................... | 710/313 |
| 2011/0238866 A1* | 9/2011 | Zitlaw .................... | 710/5 |
| 2013/0128682 A1 | 5/2013 | Henderson et al. | |
| 2014/0122822 A1* | 5/2014 | Mirichigni et al. ...... | 711/167 |

FOREIGN PATENT DOCUMENTS

EP  2363859 A2  9/2011

OTHER PUBLICATIONS

International Search Report and Written Opinion of the International Searching Authority for International Application No. PCT/US2014/040873, mailed Sep. 23, 2014, 9 pages.

\* cited by examiner

*Primary Examiner* — Arpan P. Savla

(57) ABSTRACT

Disclosed herein are system, method and/or computer program product embodiments for increasing memory bandwidth when accessing a plurality of memory devices. An embodiment operates by executing, by at least one processor, a first read operation to read data from a first memory device following an access time for the first memory device. The embodiment further includes executing, by the at least one processor, a second read operation to read data from a second memory device following an access time for the second memory device. The access time for the second memory device is substantially the same or longer than the access time for the first memory device plus a time it takes to read data from the first memory device.

20 Claims, 6 Drawing Sheets

PROGRAMMABLE LATENCY COUNT TO ACHIEVE HIGHER MEMORY BANDWIDTH

BACKGROUND

Nearly all commercial database systems rely on caching techniques to improve performance. Caches are often implemented to support memory that can be accessed quickly, such as random access memory (RAM), as opposed to storage that takes longer to access, such as disk-based storage. Caches typically store frequently used data and reduce the time needed by a database system to access a data page.

Most systems have more than one memory device (multi chip memory or MCP systems) and use a wide shared bus to read data from different memory devices depending on which memory device is selected. A host controller performs a read operation from one memory device at a time. This ensures fast data access from a particular memory, but every time a memory is selected to be read, it has to go through an initial access time, or delay, before the data can be read. This delay is imposed before each memory is read and thus can slow the memory bandwidth speed when accessing multiple memory devices.

SUMMARY

Provided herein are method, system, and computer program product embodiments, and/or combinations and subcombinations thereof, for improving the memory bandwidth of MCP systems.

An embodiment includes a computer implemented method for accessing data. The method operates by executing, by at least one processor, a first read operation to read data from a first memory device following an access time for the first memory device. The method further includes executing, by the at least one processor, a second read operation to read data from a second memory device following an access time for the second memory device. The access time for the second memory device is substantially the same or longer than the access time for the first memory device plus a time it takes to read data from the first memory device.

Another embodiment includes a system. The system includes a plurality of memory devices and at least one processor coupled to the plurality of memory devices. The at least one processor is configured to execute a first read operation to read data from a first memory device of the plurality of memory devices following an access time for the first memory device. The at least one processor is also configured to execute a second read operation to read data from a second memory device of the plurality of memory devices following an access time for the second memory device, wherein the access time for the second memory device is substantially the same or longer than the access time for the first memory device plus a time it takes to read data from the first memory device.

A further embodiment includes a tangible computer-readable device having instructions stored thereon that, when executed by at least one computing device, cause the computing device to perform operations. The operations include executing a first read operation to read data from a first memory device following an access time for the first memory device and executing a second read operation to read data from a second memory device following an access time for the second memory device, wherein the access time for the second memory device is substantially the same or longer than the access time for the first memory device plus a time it takes to read data from the first memory device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
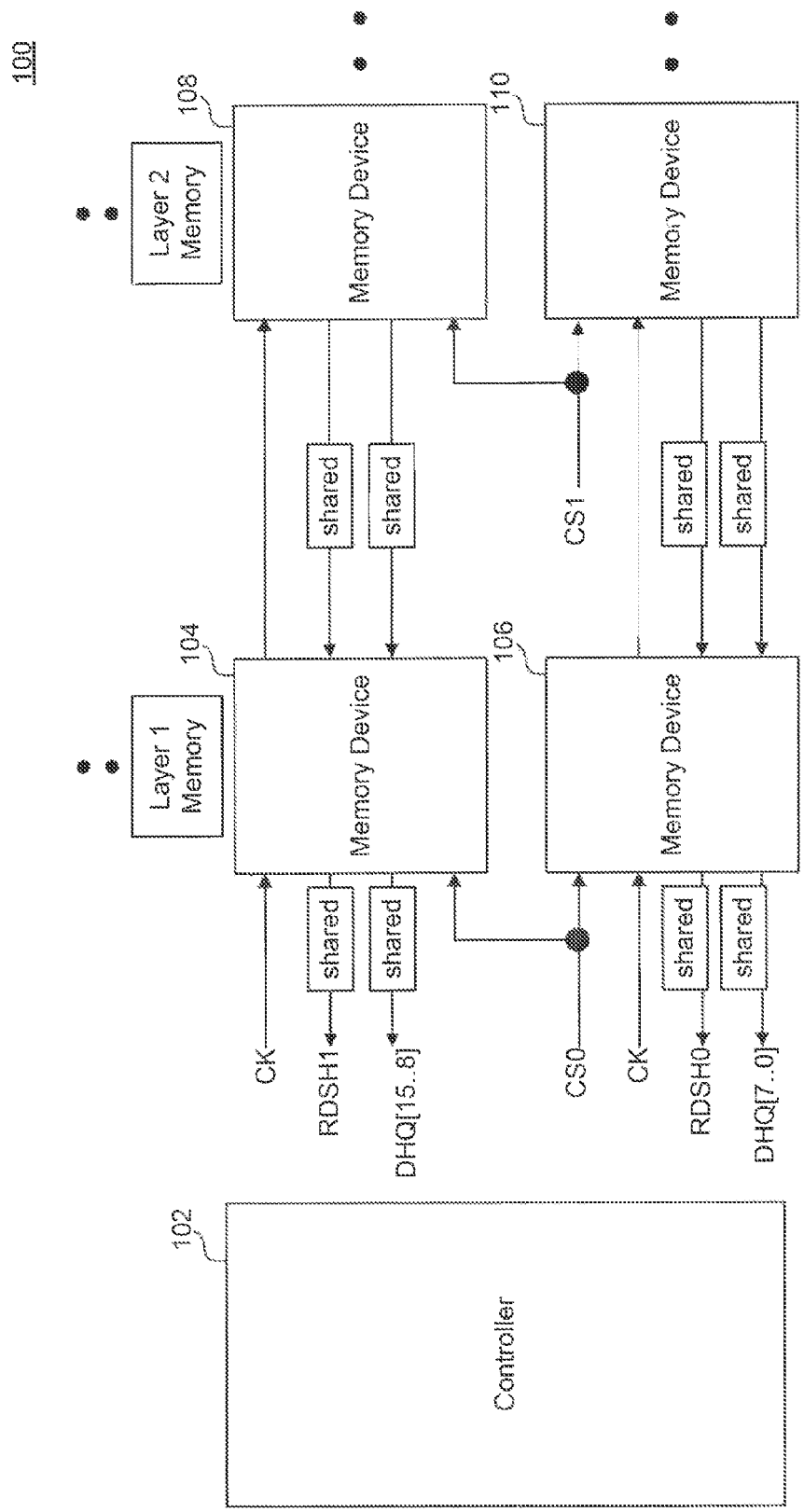
FIG. 1 is a block diagram of a multi chip memory (MCP) system, according to an example embodiment.

FIG. 1 illustrates a system 100 having a plurality of memory devices, according to an embodiment. As such, in an embodiment, FIG. 1 may illustrate a MCP system, but it should be understood that the invention is not limited to this example. System 100 may include a controller 102 and memory devices arranged in one or more layers of memory. In this example, memory device 104 and memory device 106 are in a first memory layer while memory device 108 and memory device 110 are in a second memory layer. It should be understood that while only four memory devices are illustrated, any number of memory devices may be included in a given memory layer and any number of memory layers may be utilized.

Various data lines connect to the memory devices. Two chip select data lines, CS0 and CS1, may be used to select which memory layer is currently being either read from, written to, or erased. CS0 activates both memory 104 and memory 106 while CS1 activates both memory 108 and memory 110 in this example. Other data lines may be shared between memories on different layers to reduce the number of patterned traces needed to connect to each memory device. For example, a read strobe line RDSH0 connects to both memory device 106 and memory device 110 on a shared data line while a read strobe line RDSH1 connects to both memory device 104 and memory device 108 on a shared data line. A clock CK may be shared between all memory devices, although in some embodiments, a first clock signal may be sent to memory device 104 and memory device 108 while a second clock signal may be sent to memory device 106 and memory device 110.

In an embodiment, a single data bus line connects across memory devices on different memory layers. For example, a first 8-bit data bus DQ[7 . . . 0] reads the data stored on memory device 106 when the first memory layer is selected and reads the data stored on memory device 110 when the second memory layer is selected. Likewise, in this example, a second 8-bit data bus DQ[15 . . . 8] reads the data stored on memory device 104 when the first memory layer is selected and reads the data stored on memory device 110 when the second memory layer is selected. In an embodiment, if both memory layers are selected, than each data bus would be able to read from either memory device on both memory layers during the time window that both layers are selected. Other sizes of data buses are possible as well and the invention is not limited to bus lines of only 8 bits.

Controller 102 may include one or more processors and/or circuits that are arranged to control the various data lines to each of the memory devices. For example, controller 102 may assert a logic low voltage level on CS0, effectively selecting the memory devices of the first memory layer to be either read from, written to, or erased, Controller 102 may operate to read data across all memory devices in the first memory layer, followed by reading data across all memory devices in the second memory layer. For example, if each memory device has a page size of 32 bits, then a buffer of controller 102 may store 2×32=64 B of data from memory device 104 and memory device 106 followed by storing another 2×32=64 B of data from memory device 108 and memory device 110 for a total of 128 B of data, During each read operation, read strobe RDSH0 or RDSH1 may be asserted to verify that the data is being read from a given memory device or across a plurality of memory devices.

In an embodiment, controller 102 may also be configured to program an initial access time for the memory devices of a given memory layer. The initial access time of a memory device is roughly the amount of time it takes to start reading data from the memory device after the device has been selected. Different memory device types may have different minimum access times. The access time may be programmed to be greater than the minimum access time. Controller 102 may also program different initial access times for each memory device regardless of which memory layer they are a part of.

Figure 2:
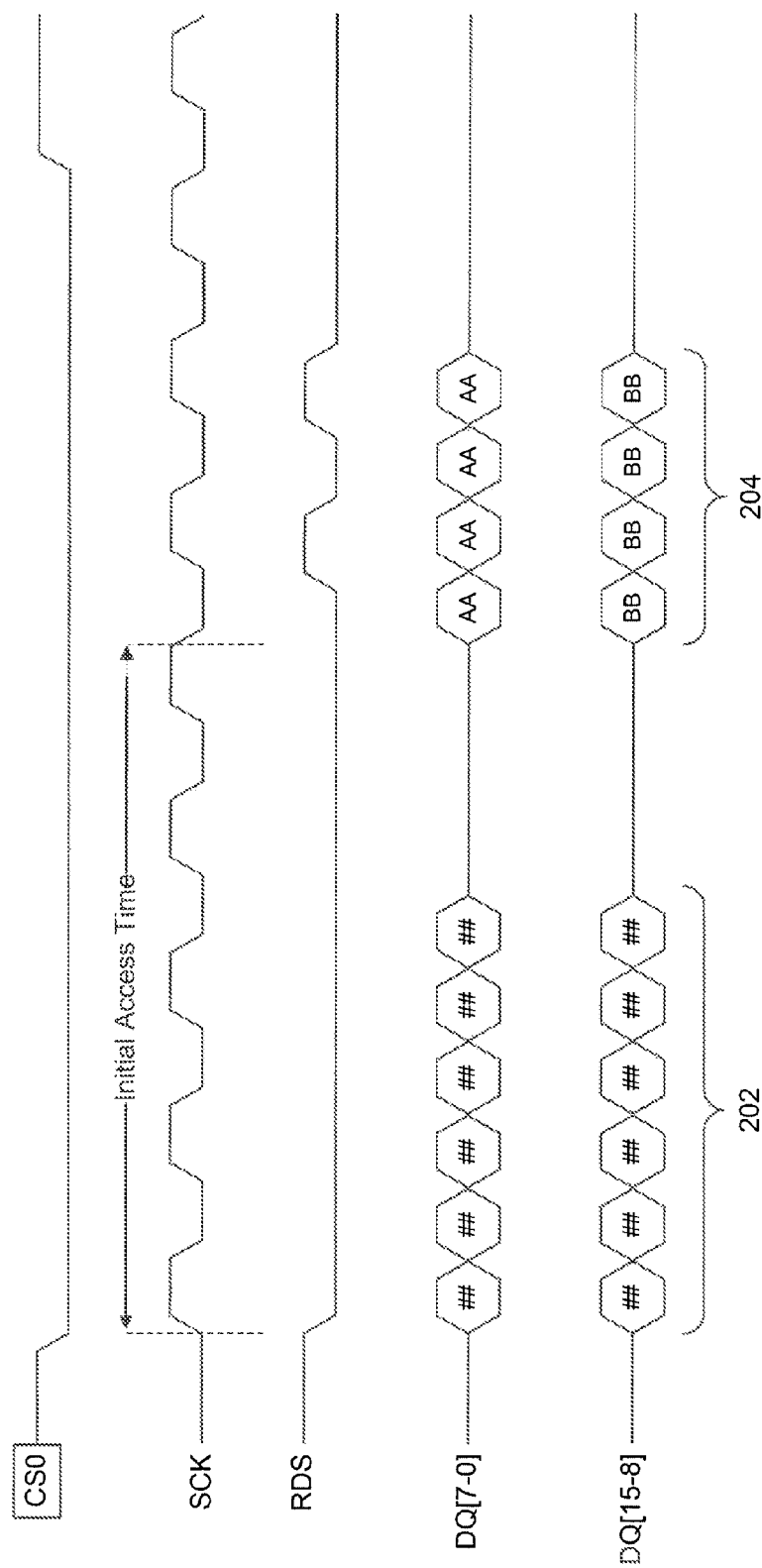
FIG. 2 is a timing diagram for reading from a memory layer, according to an example embodiment.
Figure 3:
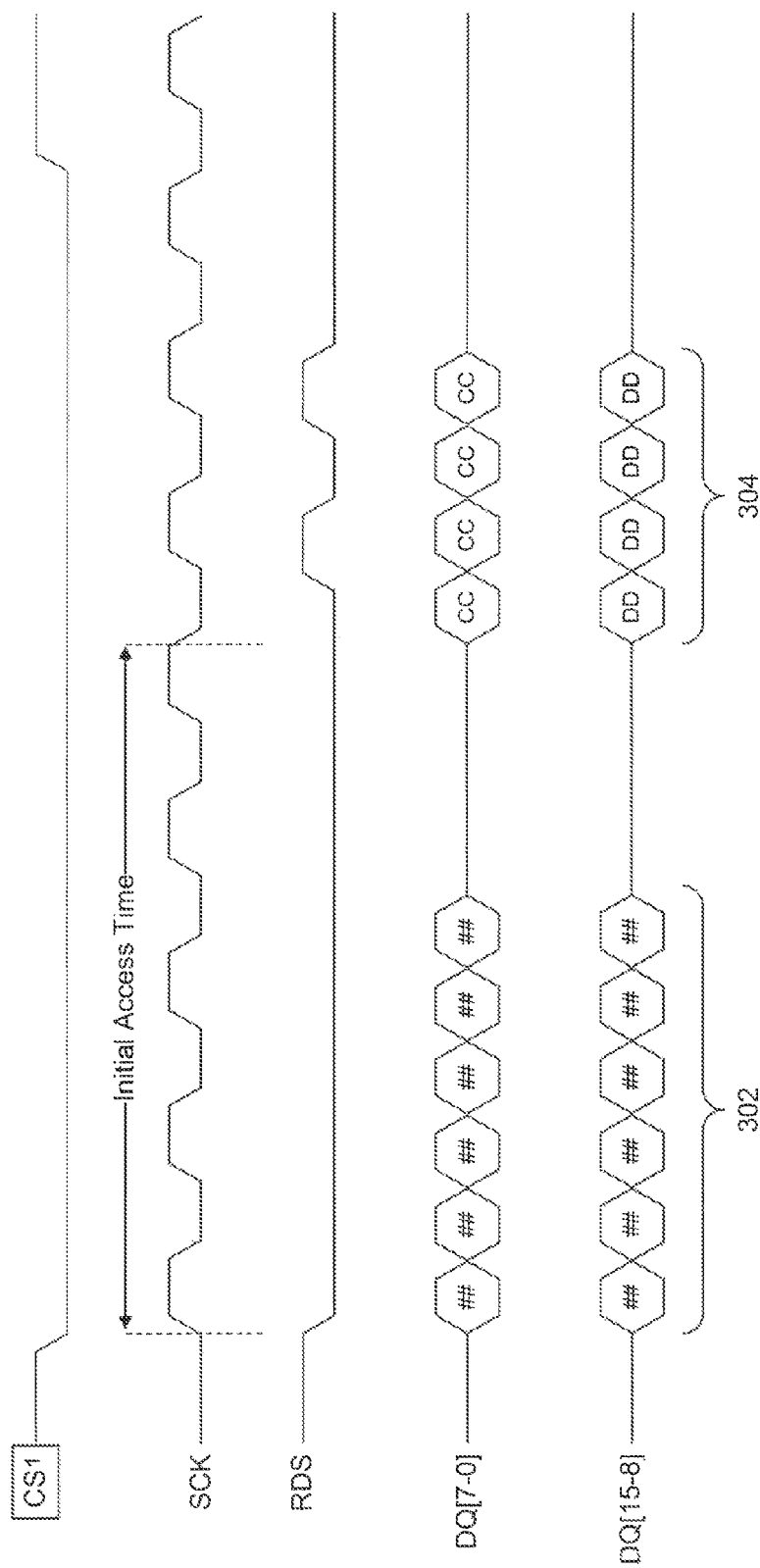
FIG. 3 is a timing diagram for reading from a memory layer, according to an example embodiment.
Figure 4:
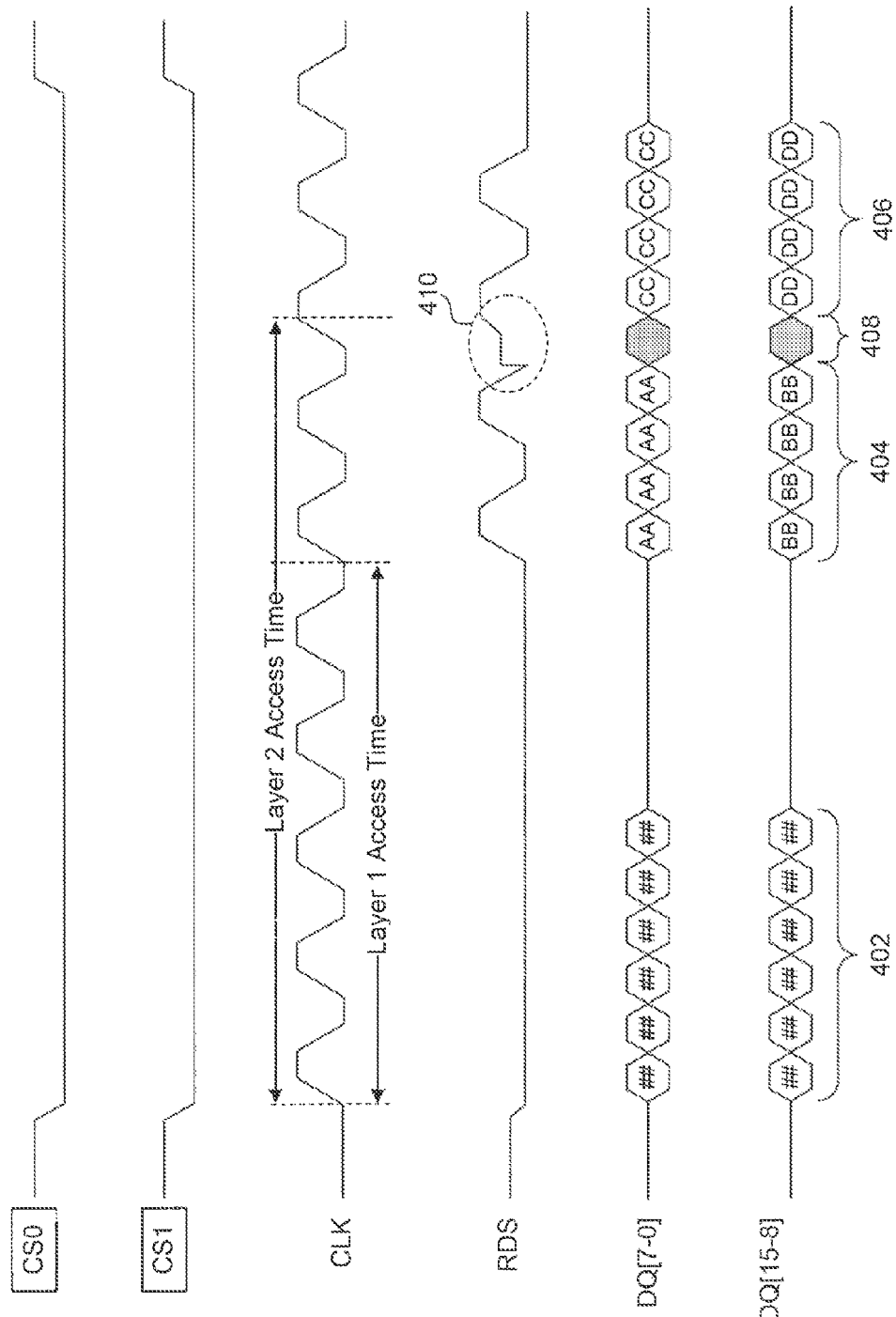
FIG. 4 is a timing diagram for reading from more than one memory layer, according to an example embodiment.

FIGS. 2-4 display various example timing diagrams that may be associated with the plurality of memory devices illustrated in system 100. For the sake of clarity in these examples, memory device 106 stores 'A' data bits, memory device 104 stores 'B' data bits, memory device 110 stores 'C' data bits, and memory device 108 stores 'D' data bits. In addition, each memory device is considered to store 32 bits of data. It should be understood that this is only exemplary, and that each memory device may store any data size and/or any data value, and may operate at times according to other timing diagrams.

FIG. 2 illustrates a timing diagram for the various data lines connected to memory device 104 and memory device 106. To read from both memory devices in the first memory layer, CS0 is asserted low to select memory device 104 and memory device 106. A memory address 202 is read on both data bus lines DQ[7 . . . 0] and DQ[15 . . . 8] to access the correct memory address location. In this example, the memory addresses would be associated with memory devices 104 and 108 for DQ[15 . . . 8] and memory devices 106 and 110 for DQ[7 . . . 0].

An initial access time is illustrated as a number of clock cycles between when the memory devices are selected to be read and the data is actually read from the selected memory devices. In an embodiment, the initial access time is programmable. When only reading sequentially from different memory devices, it is ideal for the initial access time to be as low as possible. For example, a minimum initial access time for DDR memory devices is around 120 ns.

After the initial access time has passed, data is read on both data bus lines DQ[7 . . . 0] and DQ[15 . . . 8]. As such, 32 bits of 'A' data are read from memory device 106 on data bus line DQ[7 . . . 0] and 32 bits of 'B' data are read from memory device 104 on data bus line DQ[15 . . . 8] during a read time 204. The read strobe line RDS also pulses during read time 204 to verify that the read operation has been performed successfully. In this example, the RDS timing diagram illustrated in FIG. 2 may represent both RDSH0 and RDSH1. Once read time 204 has ended, 64 B of total data have been read from memory devices 104 and 106 and CS0 is soon thereafter asserted high to de-select the use of memory devices 104 and 106.

During read time 204, data may only be read from those memory devices within the first memory layer as those are the only devices selected by asserting CS0. Accordingly, in order to read data from the memory devices within the second memory layer, CS1 is asserted as logic level low and the process repeats to read data from memory device 108 and memory device 110 as illustrated in the timing diagram of FIG. 3. Again, an initial access time is required before 32 bits of 'C' and 32 bits of 'D' data are read from memory device 108 and memory device 110.

After both read procedures are performed, 128 bits of total data have been read from the plurality of memory devices. Two periods of initial access time were required to read from the two different memory layers. Similarly, if reading was performed between n number of memory layers, then n periods of initial access time would occur. In the example shown in FIGS. 2 and 3, the initial access time is considered to be around 120 ns. Assuming a clock frequency of 68 MHz, the total bandwidth achieved is given in equation 1.

$$BW=128*1000/(120+120+(16*7)+(16*7))=275 \text{ MB/sec} \quad (1)$$

120 ns is the initial access time for each memory layer while the (16*7) is the data read time for each access layer (assuming 16 clock cycles for each data read time) in this example. The achieved memory bandwidth of 275 MB/sec is limited by the fact that two initial access times of 120 ns each were required to access the data on two memory layers. If more memory layers were to be accessed, an initial access time of around 120 ns would have been required for each of the additional memory layers.

In an embodiment, the memory bandwidth is increased by programming the initial access times such that the reading of data from a second memory layer substantially coincides with finishing the data read on a first memory layer. FIG. 4 illustrates a timing diagram for reading data from more than one memory layer, according to an embodiment.

As illustrated in FIG. 4, both chip select signals CS0 and CS1 are asserted at the same time, thus preparing memory devices on both memory layers for operation, according to an embodiment. Data will then be read from the memory devices of the first memory layer after the layer 1 access time while data is read from the memory devices of the second memory layer after the layer 2 access time. In an embodiment, the layer 2 access time is programmed to be substantially equal to, or slightly greater than, the layer 1 access time plus a time it takes to read the data from the memory devices of the first memory layer. In this way, the system does not need to wait for an entire initial access time after reading from the memory devices of the first memory layer and before reading from the memory devices of the second memory layer.

Programming of the initial access time for certain memory devices may be performed by controller 102. The programming may be performed automatically by controller 102, or in another example, a user may input an initial access time via some user interface and controller 102 executes commands to the various memory devices based on the user input. It should be understood that the layer 1 access time may be a minimum access time for the memory devices of the first memory layer, or it may also be a programmed access time. Programming the layer 1 access time may be carried out similarly to programming the layer 2 access time, according to an embodiment. Furthermore, programming an initial access time for any of the plurality of memory devices may be performed by another processing device (not illustrated in FIG. 1) while controller 102 manages the various data lines and signals coupled to the plurality of memory devices.

Returning to the example timing diagram of FIG. 4, after memory devices in both memory layers have been asserted, a command address 402 is read on both data bus lines DQ[7 . . . 0] and DQ[15 . . . 8] to access the correct memory address location, Command address 402 will connect data bus line DQ[7 . . . 0] to memory device 106 of the first memory layer and simultaneously to memory device 110 of the second memory layer since both memory layers have been asserted. Similarly, command address 402 connects data bus line DQ[15 . . . 8] to memory device 104 of the first memory layer and simultaneously to memory device 108 of the second memory layer.

Following the layer 1 access time, data is read from both memory devices of the first memory layer during a read time 404. Read strobe line RDS pulses during this time to confirm that data is being read. As such, 32 bits of 'A' data are read from memory device 106 on data bus line DQ[7 . . . 0] and 32 bits of 'B' data are read from memory device 104 on data bus line DQ[15 . . . 8] during a read time 404. Once read time 404 has ended, 64 B of total data have been read from memory devices 104 and 106. Data is not read from the memory devices of the second memory layer during read time 404, since the memory devices of the second memory layer are on hold due to the programmed layer 2 access time.

According to an embodiment, after all data has been read during read time 404, a delay 408 occurs before reading from the memory devices of the second memory layer. In an embodiment, delay 408 may be as minimal as possible, for example, a single clock cycle. During delay 408, read strobe line RDS is set to a high impedance 410, according to an embodiment. Setting RDS to high impedance 410 indicates to controller 102 that data will now be read from the memory devices of the second memory layer rather than the memory devices of the first memory layer. In other examples, there is no delay 408 following read time 404.

In the example shown in FIG. 4, the layer 2 access time is programmed to be the sum of the layer 1 access time, plus read time 404, plus delay 408. Assuming that the layer 1 access time is around 9 clock cycles and the time to read 32 bits of data from a memory device is 16 clock cycles, then the layer 2 access time is programmed to be 9+16+1=26 clock cycles in this example. Following the layer 2 access time, data is read from both memory devices of the second memory layer during a read time 406. Read strobe line RDS pulses during this time to confirm that data is being read. As such, 32 bits of 'C' data are read from memory device 110 on data bus line DQ[7 . . . 0] and 32 bits of 'D' data are read from memory device 108 on data bus line DQ[15 . . . 8] during a read time 406.

After both read procedures are performed, 128 bits of total data have been read from the plurality of memory devices and both CS0 and CS1 are de-asserted. Assuming a clock frequency of 68 MHz, the total bandwidth achieved in the embodiment illustrated in FIG. 4 is given in equation 2 below.

$$BW=128*1000/(120+14+(16*7)+(16*7))=357 \text{ MB/sec} \quad (2)$$

According to an embodiment, 14 ns is the time for the single clock cycle during delay 408. As observed by comparing the memory bandwidth achieved via equations 1 and 2, the memory bandwidth may be increased by programming the initial access times of the memory devices, according to an embodiment. The procedures described here for increasing memory bandwidth may be extended to any number of memory layers and memory devices within a given memory layer. For example, an initial access time for memory devices of a third memory layer may be programmed to be substantially equal to, or slightly greater than, the initial access time for the second memory layer plus a time it takes to read data from the memory devices of the second memory layer.

Figure 5:
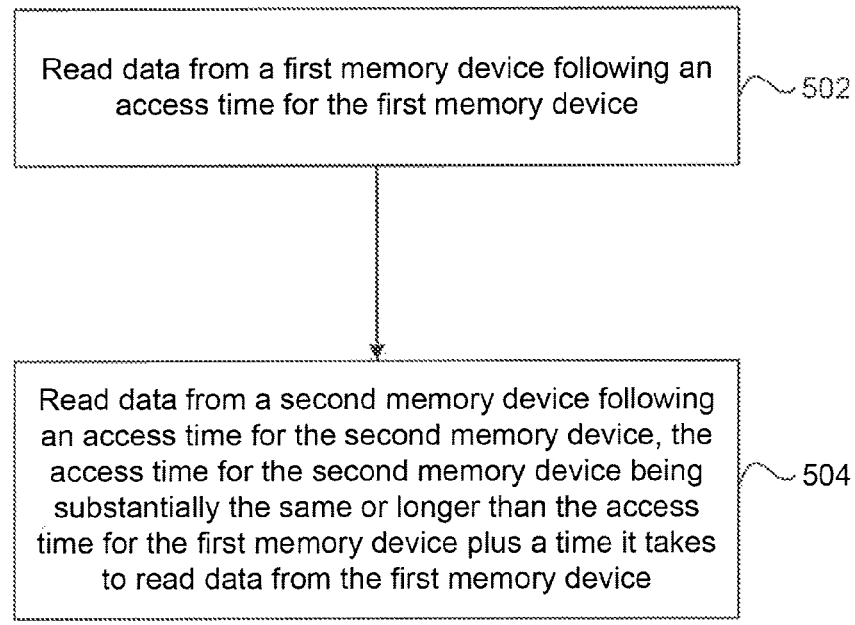
FIG. 5 is a flowchart illustrating a process for reading from more than one memory device, according to an example embodiment.

FIG. 5 illustrates a method 500 that may be performed by the components of system 100, according to an embodiment. It should be understood that other steps beyond the ones illustrated may also be performed.

At block 502, data is read from a first memory device following an access time for the first memory device. The first memory device may be part of a first memory layer that includes many memory devices. As such, in block 502, data may be read from more than one memory device across a plurality of data bus lines where each of the memory devices are in a similar memory layer. The access time may be a minimum access time allowed based on the type of memory device being accessed. For example, most non-volatile memories have an access time between 120 and 150 ns while volatile memory devices have shorter access times. For example, DRAM may have access times around 2-3 clock cycles while FRAM may have access times as short as a single clock cycle.

At block 504, data is read from a second memory device following an access time for the second memory device. The access time for the second memory device has been programmed to be substantially the same or longer than the access time for the first memory device plus a time it takes to read the data from the first memory device, according to an embodiment. In this way, memory bandwidth may be increased since there is no need to wait for the length of an entire access time after reading from the first memory device and before reading from the second memory device. The second memory device may be part of a second memory layer that includes many memory devices. As such, in block 504, data may be read from more than one memory device across a plurality of data bus lines where each of the memory devices are in a similar memory layer. The access time for the second memory device may be programmed at any time before method 500 is carried out.

In some embodiments, a delay exists between the reading of data from the first memory device and the reading of data from the second memory device. During the delay, a read strobe line accessible to both the first and second memory device may be asserted to a high impedance value so that the first memory device can release ownership of a data line, and the second memory device can acquire ownership of the same data line.

Example Computer System

Figure 6:
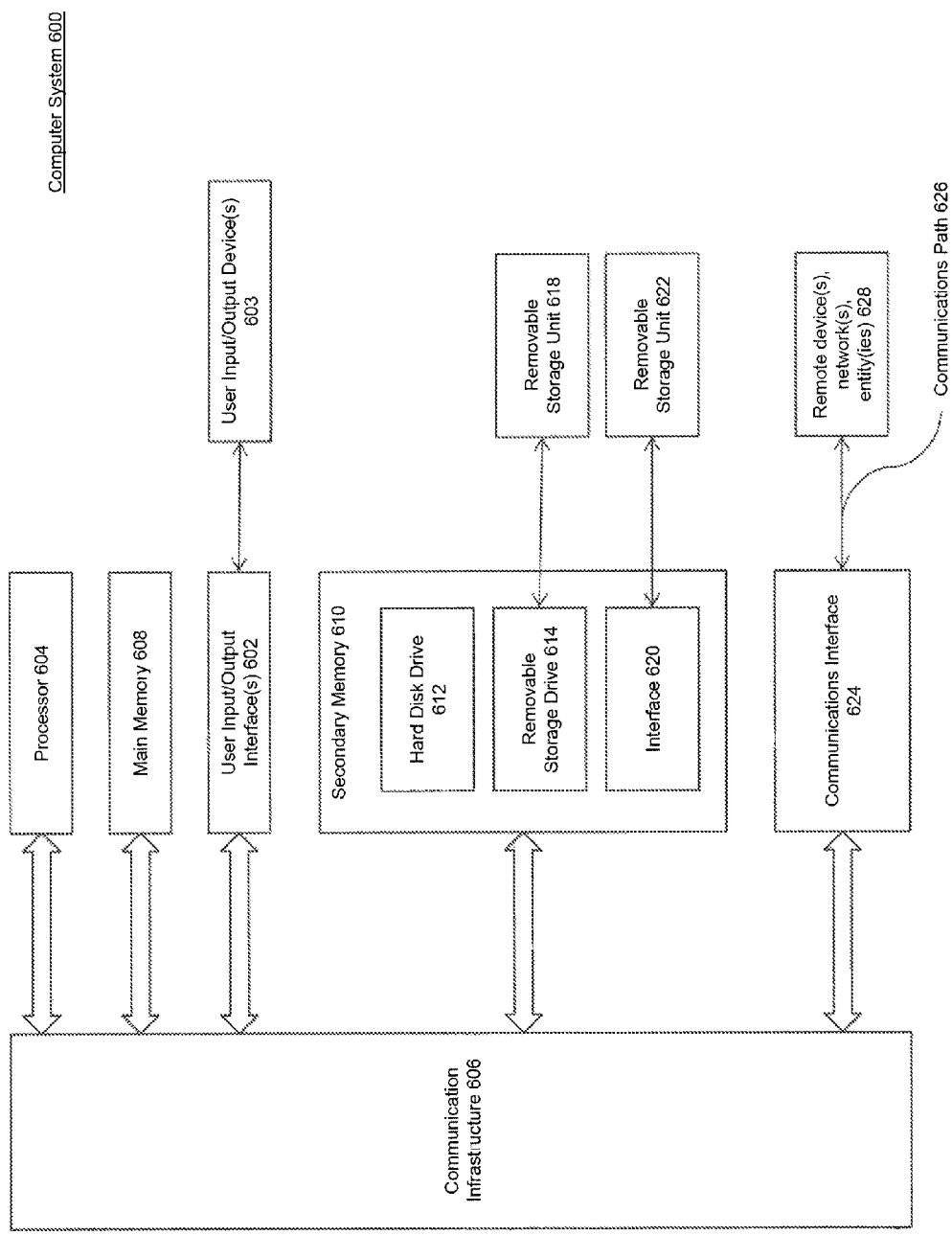
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to as communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data. In an embodiment, at least main memory 608 may be implemented and/or function as described herein.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for accessing data, comprising:
    executing, by at least one processor, a first read operation to read data from a first memory device following an access time for the first memory device; and
    executing, by the at least one processor, a second read operation to read data from a second memory device following an access time for the second memory device, wherein the access time for the second memory device is the same or longer than the access time for the first memory device plus a time it takes to read data from the first memory device, wherein the executing a first read operation and the executing a second read operation begin at a same cycle of a system clock.

2. The method of claim 1, wherein the access time for the second memory device is the same or longer than a minimum access time for the first memory device plus the time it takes to read data from the first memory device.

3. The method of claim 1, further comprising:
    executing, by the at least one processor, a third read operation to read data from a third memory device following an access time for the third memory device.

4. The method of claim 3, wherein the access time for the third memory device is the same or longer than the access time for the second memory device plus a time it takes to read data from the second memory device.

5. The method of claim 1, further comprising:
    selecting, by the at least one processor, the first memory device using a first chip select signal and the second memory device using a second chip select signal.

6. The method of claim 5, wherein selecting the first memory device and selecting the second memory device occur at the same cycle of the system clock.

7. The method of claim 5, further comprising:
    de-asserting, by the at least one processor, the first chip select signal and the second chip select signal after data is read from the second memory device.

8. The method of claim 1, further comprising:
    setting, by the at least one processor, a read strobe line to a high impedance output after data is read from the first memory device and before the second read operation is executed.

9. The method of claim 1, wherein executing a first read operation comprises executing a first read operation to read data from the first memory device and from another memory device following the access time for the first memory device.

10. The method of claim 1, wherein executing a second read operation comprises executing a second read operation to read data from the second memory device and from another memory device following the access time for the second memory device.

11. A system, comprising:
    a plurality of memory devices; and
    at least one processor coupled to the memory devices and configured to:
    execute a first read operation to read data from a first memory device of the plurality of memory devices following an access time for the first memory device, and
    execute a second read operation to read data from a second memory device of the plurality of memory devices following an access time for the second memory device, wherein the access time for the second memory device is the same or longer than the access time for the first memory device plus a time it takes to read data from the first memory device, wherein the execution of the first read operation and the second read operation begins at a same cycle of a system clock.

12. The system of claim 11, wherein the access time for the second memory device is the same or longer than a minimum access time for the first memory device plus the time it takes to read data from the first memory device.

13. The system of claim 11, the at least one processor further configured to:
    execute a third read operation to read data from a third memory device following an access time for the third memory device.

14. The system of claim 13, wherein the access time for the third memory device is the same or longer than the access time for the second memory device plus a time it takes to read data from the second memory device.

15. The system of claim 11, the at least one processor further configured to:
    select the first memory device using a first chip select signal and the second memory device using a second chip select signal.

16. The system of claim 15, the at least one processor configured to select the first memory device and select the second memory device at the same cycle of the system clock.

17. The system of claim 11, the at least one processor further configured to:
    set a read strobe line to a high impedance output after data is read from the first memory device and before the second read operation is executed.

18. The system of claim 11, wherein the at least one processor is configured to execute the first read operation to read data from the first memory device and from another memory device following the access time for the first memory device.

19. The system of claim 11, wherein the at least one processor is configured to execute the second read operation to read data from the second memory device and from another memory device following the access time for the second memory device.

20. A non-transitory computer-readable device having instructions stored upon that, when executed by at least one computing device, causes the at least one computing device to perform operations comprising:
    executing a first read operation to read data from a first memory device following an access time for the first memory device; and
    executing a second read operation to read data from a second memory device following an access time for the second memory device, wherein the access time for the second memory device is the same or longer than the access time for the first memory device plus a time it takes to read data from the first memory device, wherein the executing a first read operation and the executing a second read operation begin at a same cycle of a system clock.

* * * * *